United States Patent [19]

Hönig et al.

[11] 4,174,688

[45] Nov. 20, 1979

[54] DIGITAL-ELECTRONIC ENGINE IGNITION SYSTEM

[75] Inventors: Guenther Hönig, Markgröningen; Uwe Kiencke, Ludwigsburg; Martin Zechnall, Schwieberdingen, all of Fed. Rep. of Germany

[73] Assignee: Robert Bosch GmbH, Stuttgart, Fed. Rep. of Germany

[21] Appl. No.: 853,432

[22] Filed: Nov. 21, 1977

[30] Foreign Application Priority Data

Dec. 10, 1976 [DE] Fed. Rep. of Germany ....... 2655948

[51] Int. Cl.$^2$ .............................................. F02P 5/04
[52] U.S. Cl. ........................... 123/117 D; 123/148 E
[58] Field of Search .......... 123/117 D, 117 R, 148 E, 123/146.5 A; 364/431

[56] References Cited

U.S. PATENT DOCUMENTS

| | | | |
|---|---|---|---|
| 3,921,610 | 11/1975 | Hartig | 123/117 D |
| 3,939,811 | 2/1976 | Sasayama | 123/117 R |
| 4,018,202 | 4/1977 | Gartner | 123/117 D |
| 4,051,822 | 10/1977 | Yoshida | 123/117 D |
| 4,052,967 | 10/1977 | Colling et al. | 123/148 E |
| 4,063,539 | 12/1977 | Gorille et al. | 123/117 D |

Primary Examiner—Charles J. Myhre
Assistant Examiner—Andrew M. Dolinar
Attorney, Agent, or Firm—Frishauf, Holtz, Goodman & Woodward

[57] ABSTRACT

The engine for which the system provides ignition control produces a basic signal giving the time lapse of a predetermined angle of crankshaft rotation. Leading and trailing edges of this basic signal produce control signals. During the interval between these two a first counter stepped by clock pulses produces a count proportional to engine speed down to a certain relatively low engine speed beyond which overflow of the counter holds the counter at its maximum value. The count so determined is utilized in an ROM as the engine speed parameter which together with other engine operation parameters produce the address that selects the appropriate number to control computed ignition timing. According to the engine speed range, a second counter is loaded either with the number provided by the ROM, or with a count number based on engine speed only and the second counter then counts down past thresholds provided by a second ROM to determine both the moment of closure of the electronic switch and the moment of opening. The closure interval is generally maintained constant, consistently so at low speeds, but at high speeds a minimum open interval of the electronic switch in the primary circuit of the ignition transformer overrides this requirement. In certain embodiments ignition timing is provided by the reaching of a threshold value of current in the primary winding, under certain limited conditions.

50 Claims, 14 Drawing Figures

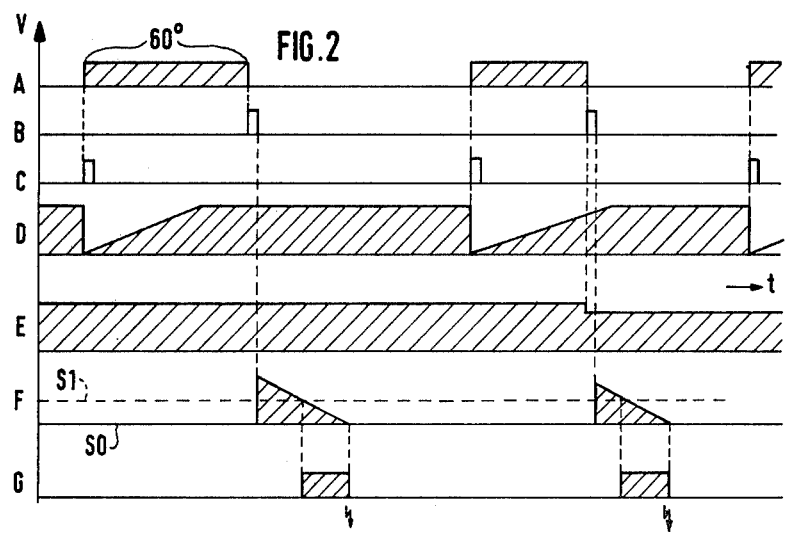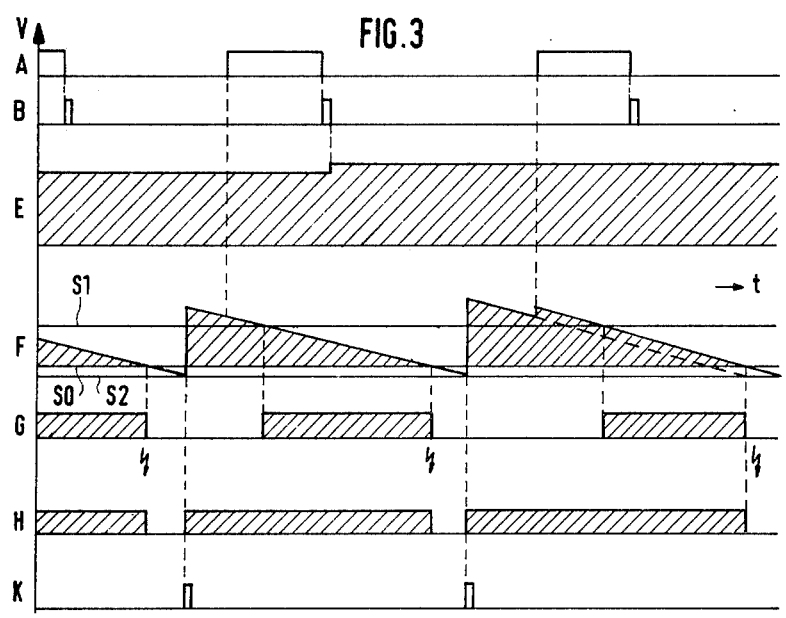

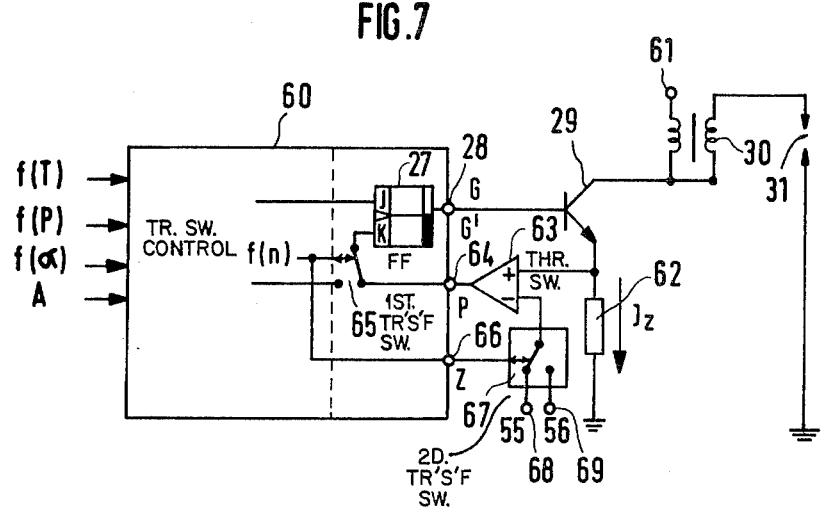
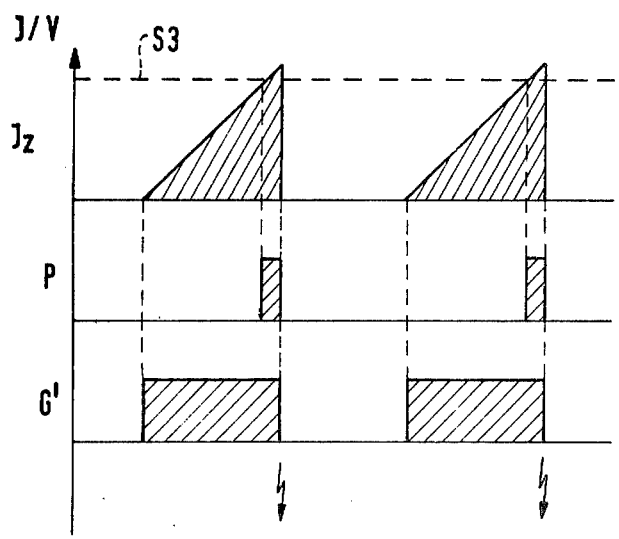

DIGITAL-ELECTRONIC ENGINE IGNITION SYSTEM

This invention concerns an ignition system for an internal combustion engine such as a motor vehicle engine in which the ignition timing is accomplished mainly by digital electronic circuitry controlling the closure interval of an electronic switch located in the circuit of the primary coil of an ignition transformer in response to a rotary signal generator driven by the engine providing at least a signal representative of a predetermined angular sector of rotation of the engine.

BACKGROUND AND PRIOR ART

Circuits used heretofore for controlling the closure time interval of an electronic switch in the circuit of the primary winding of an ignition transformer usually operate on an extrapolated basis, which is to say that the engine rotation angle during which the switch is closed is determined by speed information that was determined at some preceding time. During dynamic transitions (acceleration or slowing down of engine speed) the errors are so large at low speeds even for relatively small acceleration values that the ignition can malfunction. In the case of deceleration the switch closure interval can be too great, so that the final transistor located in the primary circuit of the ignition transformer and even the ignition transformer itself can be too heavily loaded. If the speed is zero, a supplementary circuit is necessary for shutting off the quiescent current, since the current through the ignition transformer would produce an excessive current drain if prolonged.

THE PRESENT INVENTION

It is an object of the present invention to provide an electronically controlled ignition system operable mainly by digital electronics in which the operating parameters utilized for control of ignition timing are as up-to-date as possible and particularly one in which the engine speed information is utilized on a substantially current basis.

Briefly, means are provided for maintaining a substantially constant time interval of closure of the electronic switch in the ignition transformer primary circuit, which closure time corresponds to the current rise time in that circuit up to substantially maximum current therein; a first counter is provided responsive to the signal of the rotary signal generator for providing, in response to engine rotation, a signal representative of engine speed; means responsive to the output of the first counter are provided for varying the time of beginning of the time interval of switch closure in a subsequent engine rotation cycle; means are provided for computation of ignition timing in response to engine rotation and to the value of engine operation parameters, and means are provided for shifting the beginning and/or the end of the time interval of switch closure in accordance with variation of the ignition timing computed by the aforesaid ignition timing computation means, which last means can conveniently be a read-only memory addressed by signals representative of engine operation parameters.

In the preferred design of the ignition system of the present invention a second counter is provided that operates repetitively and a recognition circuit provided for recognizing the crossing of at least two count threshold values. In general, in response to crossing of the first threshold count value a signal is produced for causing the beginning of the closure interval of the electronic switch and in response to a crossing of the second threshold count value the closure interval of the switch is terminated. Preferably the first counter builds up a count state representative of engine speed during the presence of a signal representative of the time during the which the engine rotates through a predetermined angular sector and at the end of the build-up of that count, the count result is transferred into the second counter and, furthermore, ignition timing computation means are arranged to cause the count condition of the second counter to be corrected to accord with the output of the ignition timing computation means.

Because of the length of description necessary to make intelligible the many features of the ignition system of the invention cooperating in the preferred embodiments, further statement of the nature of the invention is postponed until the description of the several preferred embodiments, except for a brief reference to the advantages of the invention.

ADVANTAGES OF THE INVENTION

With the system of the invention the closure time period of the electronic switch can be controlled with accurate reference to the actual ignition timing moment down to the lowest speeds and even during the dynamic processes of acceleration and deceleration. With respect to lagging speed information that may be used for the control of ignition timing, as distinguished from control of the switch closure time interval, the ignition timing may be subject to some error, but this practically no effect on the closure interval in the system of the present invention. In consequence a particularly favorable design of the power-carrying components of the ignition system can be provided, since the power losses in the switching transistor and in the windings of the ignition transformer are minimized.

It is particularly advantageous to provide among the particular features of the ignition circuit of the invention a measuring of the current through the electronic switch that is connected to a threshold stage that provides an output signal when the current has passed a threshold current value, such a signal providing a kind of measured ignition timing moment while the second threshold value of the second counter can be regarded as providing a calculated ignition timing moment, so that a switch-over circuit, in effect an input selection circuit, at the control input of the transistor in the primary circuit of the ignition transformer can selectively connect the control of ignition timing to either of the above-mentioned threshold operations. The switch-over device just mentioned is preferably controlled by a signal dependent on engine speed, so that at low speed the current in the primary circuit times the ignition, and at high speeds the ignition timing is provided by the ignition timing computation means. By this arrangement errors resulting from the influence of various parameters such as supply voltage value, temperature, variation of component characteristics within manufacturing tolerances and aging of components are prevented in the critical region of low-speed operation. By these provisions, the transistor operating as the electronic switch in the primary circuit of the ignition transformer is always operated as a switching transistor with minimum power losses in spite of the above-mentioned variable defects. At higher speeds and, therefore, at shorter switching periods, where the variable influences just mentioned hardly have any further effect, ignition timing and the adjustment of the switch closure time is controlled by the ignition timing computation means.

It is furthermore particularly advantageous, for improving of the dynamical characteristics of the engine as well as for reduction of fluctuations in the ignition angle, which in general is provided by influencing the ignition timing by the current rise time in the primary circuit of the ignition transformer, to set a tolerance period that begins with the output signal of a threshold circuit responsive to the current rise in the primary circuit and ends as the result of counting operations in a counter. At the very latest, the ignition will be triggered at the end of this tolerance period by the counter. During the tolerance period ignition can be triggered by the timing moment calculated by the ignition timing computation means and if the calculated timing moment occurs before the beginning of the tolerance period, the ignition timing is triggered at the beginning of the tolerance period. By such provisions the advantage is obtained that the ignition angle is not varied by the smallest voltage and temperature variations that occur between successive ignition events. A calculated change of ignition angle becomes effective only by a shift of the closure period, so that an additional dead period is avoided which would cause a dynamic degradation of the operation of the ignition timing computation means.

Drawings, illustrating examples:

FIG. 2 is a timing diagram in the form of a graph for explaining the mode of operation of the circuit of FIG. 1 at very low speeds (e.g. starting of an engine);

FIG. 3 is a timing diagram in the form of a graph for explaining the mode of operation of the system of FIG. 1 for medium speeds;

FIG. 7 is a circuit diagram of a second illustrative embodiment of the invention explaining speed control selection of ignition timing by the timing computer or by a threshold current value in the primary circuit of the ignition transformer;

FIG. 8 is a timing diagram in the form of a graph for explaining the mode of operation of the circuit of FIG. 7;

Figure 1:
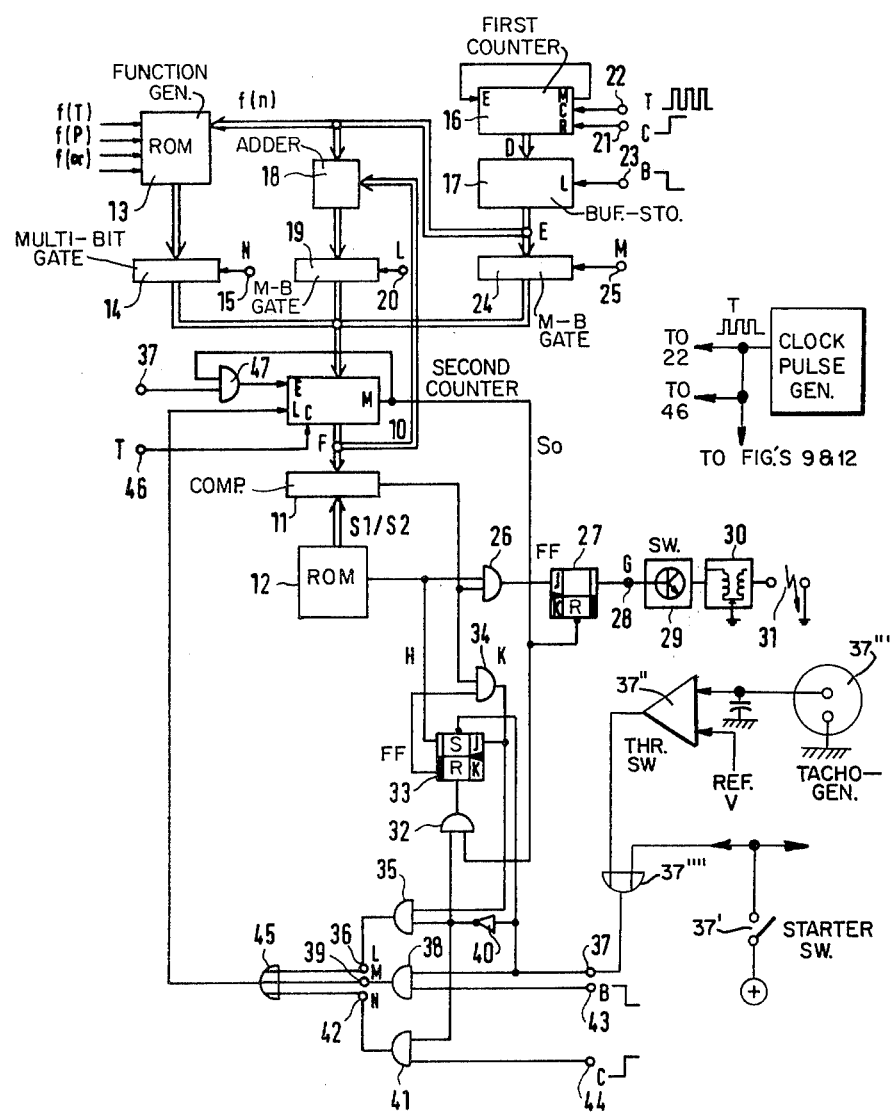
FIG. 1 is a circuit diagram of a first embodiment of the invention having computation controlled ignition timing over all speed ranges.

DESCRIPTION OF THE PREFERRED EMBODIMENTS.

In the following description, particularly in the initial portion thereof, there are provided in parentheses the type numbers by which integrated circuit units suitable for the particular components are known in the trade or sometimes an alphabetical designation by which the kind of component is commonly known. Similarly there are provided in parentheses some of the common designations for functional inputs of some of these devices.

The circuit of FIG. 1 utilizes two counters, a first counter 16 (74191), the operation of which will be described further below, and a second counter 10 (74191), both of which are connected to receive counting pulses of a counting frequency T at an input, in the case of the first counter from the terminal 22 and in the case of the second counter from the terminal 46. The second counter 10 has a data output connected on a multibit basis to a digital comparator 11 (7485) which has another multibit input to which fixed value data are supplied from a read-only memory 12 (ROM). Another read-only memory 13 (ROM) stores a multiplicity of fixed values the addresses of which in the memory are selectable in terms of combinations of parameter values, particularly parameters of an internal combustion engine, and these fixed values, as addressed, are furnished on a multibit basis to a multibit gate 14 of the kind known as a transmission gate (CD 4016) through which the data may be passed to the count-setting input, the so-called parallel input, of the second counter 10. Control of the first multibit gate 14 is produced over the terminal 15, the designation N at that place on FIG. 1 identifying the signal which provides the control as further described below. As examples of the parameters in terms of which the ROM 13 is addressed, there may be mentioned the engine speed n, the intake vacuum (under-pressure) p, the temperature T and the throttle vane angular position α of the engine for which the system of FIG. 1 controls the ignition.

The first counter 16 provides its count output on a multibit basis through a buffer storage unit 17 (74174), a digital adder 18 (7483) and a second multibit transmission gate 19 to the parallel input of the second counter 10. The second multibit gate 19 is controlled electrically over the terminal 20. The count output of the second counter 10, in addition to being provided to the comparator 11, is also connected back to one of the inputs of the adder 18 of the sequence of circuits just mentioned. The first counter 16 has a reset input connected to a terminal 21 and has an overflow output M (min-max-output) that is connected to its "enable" input E in a sense which uses the input E as a blocking input, so that the counter will not continue counting after overflow.

The alphabetic symbols, such as E,C,J,K,L,M and R identifying terminals of circuit units and appearing within the rectangles designating the circuit units are completely unrelated to the signals appearing at particular circuit points identified in many cases by the same letters appearing near a circuit point and outside a circuit-designating rectangle.

The loading input L of the buffer store 17 is connected to a terminal 23. The data outputs of the buffer store 17, in addition to being connected to a set of inputs of the adder 18, are also connected with inputs of the second ROM 13, thereby providing a signal dependent upon engine speed which may participate in the addressing of the ROM along with the signals dependent upon other engine operation parameters shown coming in from the left in FIG. 1.

The data outputs of the buffer store 17, moreover, are also provided to a third multibit transmission gate 24 through which these outputs can go directly to the count-setting inputs of the second counter 10 when the multibit gate 24 is opened by a signal on the terminal 25. The output of the comparator 11 is connected through a first AND-gate 26 with the J input of a JK flip-flop 27 that has a reset input R connected to the overflow output M of the second counter 10. The output of the flip-flop 27 is connected, by way of a terminal 28, to the control input of an electronic switch 29 which is preferably constituted as a transistor, the switching path of which is connected in the primary current circuit of an ignition transformer 30. In the circuit of the secondary side of the ignition transformer 30, at least one spark gap 31 is connected through the usual ignition cable, the gap being provided in the form of a sparkplug in an engine cylinder in the usual way. For the purposes of the present invention, it is not necessary to discuss the possible arrangements for ignition distribution in the case of an engine with two or more cylinders.

The overflow output M of the second counter 10 is also connected through a second AND-gate 32 with the reset input R of a second JK flip-flop 33. An output of this flip-flop 33 is connected both to a second input of the first AND-gate 26 and also to an input of the first ROM 12 which serves for switching over the multibit output furnished by the ROM 12 to the comparator 11 between two output signals S1 and S2, this selection signal applied to the ROM 12 and to the AND-gate 26 being identified for further explanation as the signal H. The second output, complementary to the first, of the multivibrator 33 is connected through a third AND-gate 34 with the J input of this same flip-flop 33. A second input of the AND-gate 34 is connected to the output of the comparator 11.

The J input of the flip-flop 33 is connected through a fourth AND-gate 35 with a terminal 36. A terminal 37, to which a signal indicative of very low engine speed is applied when such condition is present, is connected both with the set input S of the flip-flop 33 and through a fifth AND-gate 38 to a terminal 39. The signal designating very low engine speed appears, for example, during the starting of the engine, and is produced either in response to the starting switch 37 of the engine or by a signal from a threshold switch 37 operating on the output of a tachogenerator 37, this signal in each case being supplied to the terminal 37 as already mentioned. When a speed threshold stage is used for this purpose, the threshold is preferably set at a value of 500 r.p.m. It is possible to provide both signals, from a starter switch and from an underspeed signal, through suitable linkage, such as an OR-gate 37, to the terminal 37.

The terminal 37 is also connected through an inverter 40 to second inputs of the AND-gates 32 and 35 already mentioned and to an input of a sixth AND-gate 41, the output of which is connected to a terminal 42. A second input of the AND-gate 38 is connected to a terminal 43 and a second input of the AND-gate 41 to a terminal 44.

The three terminals 36, 39 and 42 are connected through an OR-gate 45 with the loading input L of the second counter 10. The overflow output M of the second counter 10, in addition to being connected as described above, is connected through a seventh AND-gate with the enable input E used as a blocking input for this counter. The second input of the AND-gate 47 is connected to the terminal 37 that was just discussed above.

Operation of FIG. 1 Circuit

Figure 4:
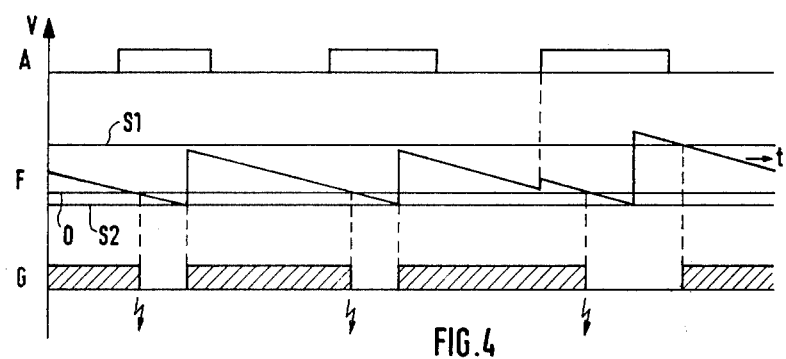
FIG. 4 is a timing diagram in the form of a graph for explaining the mode of operation of the system of FIG. 1 at high speeds.

The timing diagrams in FIGS. 2–4 are helpful for explaining the operation of the circuit of FIG. 1. In this connection, the definitions should be kept in mind of the expressions "1-signal" and "0-signal" commonly used in digital electronics. By a 1-signal is meant a potential of the order of magnitude of the potential of the positive pole of the power supply voltage of the circuit and by a 0-signal is meant a potential that corresponds approximately to reference potential, generally referred to as ground potential or, in the case of vehicles, chassis ground.

Description of FIG. 2

FIG. 2 illustrates operation at very low engine speeds and in starting. In this case, as just described, a 1-signal is present at the terminal 37, as the result of which the output of the inverter 40 blocks the AND-gates 32, 35 and 41. A rotary reference signal generator driven by the engine, preferably driven by the engine crankshaft itself, produces constant rotary angle signals A illustrated on the top line of FIG. 2 which may, for example, be present during an angular segment of 60° of crankshaft rotation. This angular segment can of course be set at other angular values as may appear suitable to particular engines. By means not shown in FIG. 1, the leading edge of the signal A is used to produce a signal C and the trailing edge a signal B. The actual generation of the signals A, B and C is explained further below with reference to FIGS. 5 and 6.

If a start signal is present at the terminal 37 and a signal B at the terminal 43, a signal M will appear at the terminal 39 which will proceed to the loading input L of the second counter 10 through the OR-gate 45 and will also appear (connection not shown to simplify the drawing) at the terminal 25 to open the multibit gate 24. In consequence, the value E stored in the buffer store 17 will be loaded into the second counter 10. The other two multibit gates 14 and 19 are blocked, because they are controlled by outputs of the AND-gates 41 (signal N) and 35 (signal L) respectively. These two gates 35 and 41 are blocked by the inverter 40 as explained above.

The stored value E is obtained from the first counter 16, which was reset by a signal C from the terminal 21 that was produced simultaneously with the leading edge of the signal A. The count output of the first counter 16 is designated D and is counted upwards in response to pulses of the counting frequency T produced by a timing pulse generator, sometimes referred to as a "clock" (not shown). Overflow blocking provided by feeding back the overflow output to the blocking input has the result of ending the upward count at the maximum count content. When a signal B appears at the terminal 23, the count content at this moment is loaded into the buffer store 17. This value is designated E. In the first cycle illustrated in FIG. 2, the case is shown in which the value E stored in the buffer store 17 is not changed when a signal B appears, because the value already stored there was identical. In the second cycle shown, however, where a time-compressed signal A signifies increased engine speed, the count condition D of the first counter has not yet reached its maximum value when the signal B appears and the lower count D is stored as the value E. The stored value E depends on engine speed down to a very low speed at which the first counter 16 counts up to its maximum value in every cycle, below which low speed the value remains constant. As a value dependent upon engine speed even at most low speeds, the value E participates with other parameters in the selection of addresses in the second ROM 13.

The value E, taken over in the second counter 10 upon the occurrence of the signals B and M is then counted downwards in the second counter 10 at the counting frequency T. Since the reset input R of the multivibrator 33 is blocked, the first ROM 12 is switched to its output value S1 and cannot switch over, because the output signal H of the flip-flop 33 cannot change. When the counter 10 reaches the count value S1, the comparator 11 produces an output signal that passes through the AND-gate 26 to set the flip-flop 27, so that a signal G appears at the terminal 28. The electronic switch 29 is closed by this signal G and current begins to flow through the ignition transformer 30. When the counter 10 overflows and reaches its minimum count condition, a signal from the overflow output M resets the flip-flop 27 by its reset input R, thereby terminating the signal G. In consequence, the electronic switch 29 is blocked and an ignition spark is produced by induction at the spark gap 31. At the same time the blocking input E of the second counter 10 receives a signal from the overflow output M through the AND-gate 47 to cause the counter 10 to remain in its minimum count condition. Only by the next signal B will the counter 10, as already described, have a stored value E provided to it again. By this arrangement, even at the lowest speeds, the engine operates with constant electronic switch closure time and, in addition, an automatic freedom from quiescent current when the engine is stopped is provided without any additional circuit expense or complication. In this case the overflow signal M provides a first count state recognition signal which reset (turns off) the flip-flop 27 of the output logic circuits, while the comparator 11 provides a second count state recognition signal through the gate 26 to set (turn on) the flip-flop 27. In other embodiments, described further below, the comparator 11 is used for count state recognition both for turning on and turning off the flip-flop 27.

FIG. 3 shows the operating relations at medium speeds, i.e. at engine speeds between about 500 and 3,000 r.p.m. The actual values of this medium range can of course be shifted one way or the other to suit the particular case, for example in accordance with the kind of motor involved. In the case of a racing-car motor, for example, the medium speed range is different from that of a low speed utility motor. The generation of the storage value E takes place in the present case the same way as in FIG. 2. Since no start signal is present at the terminal 37, the AND-gate 38 and the multibit gate 24 remain continuously closed. Upon the appearance of a signal K, the generation of which will be described further below, a signal L is produced at the terminal 36 by which, on the one hand, the multibit gate 19 is opened and, on the other, the loading input L of the second counter 10 is operated, so that the output value of the adder 18, i.e. the value formed by the sum of the signals E and F, is loaded into the second counter 10. Since the count value F at this time agrees with the threshold value S2, which is negative, a count value is taken over into the second counter 10 that is of reduced magnitude compared with the stored value E. The counter 10 now counts downward, as already described, and when the threshold value S1 is reached, this value also being supplied at the output of the ROM 12, a signal is produced by the comparator 11. The latter signal, as already described, closes the electronic switch 29 and starts up the rise of current in the ignition transformer. When the 0-count condition is reached, the overflow output M of the second counter 10 again sets off an ignition spark. In contrast to the relations at very low speeds illustrated in FIG. 2, the AND-gate 47 is now closed, so that the second counter 10 can continue counting into the negative region. The overflow signal not only does not stop the counter 10 in this case, but it resets the flip-flop 33 through the AND-gate 32, so that the signal H changes from a 1-signal to a 0-signal and thereby changes the output threshold value provided by the ROM 12 from S1 to S2. As soon as the count condition S2 is reached in the counter 10, the comparator again produces an output signal, one result of which is that a signal K is generated through the AND-gate 34. This signal K loads, as already described, the second counter again with the output value of the adder 18. The signal K also again sets the flip-flop 33, so that the output signal H again appears as a 1-signal. This signal H again causes the output of the ROM 12 to switch to its threshold value output S1. The complementary output of the flip-flop 33 changes to an 0-signal, causing the AND-gate 34 to block again, as the result of which the signal K is terminated. The value with which the counter 10 is loaded through the multibit gate 19 is equal to the expected ignition timing interval reduced by a minimum open time. In the illustrated case, the ROM 13 serves the function of an ignition timing computer, of which many kinds are known and likewise provide a digital output and can be provided in forms suitable for use in the system of the present invention. In the illustrated case the computation of the ignition timing on engine operation parameters, particularly the engine speed, and usually others also, is computed as if by looking up in a table the precomputed timing stored for the nearest equivalent combination of parameter values. This is a practical system because read-only memories of very large capacities with small dimensions are now readily available. As the engine operates, the output of the read-only memory 13 continuously provides the appropriate ignition timing number for use in the system, just as any other known kind of digital ignition computer could be organized to do.

When a signal C appears at the terminal 44, the AND-gate 41 being open, a signal N is produced at the terminal 42 and is applied to the OR-gate 45 to the loading input of the second counter 10. At the same time the signal N appears at the terminal 15 by a connection not shown, to open the first multibit gate 14, so that the output count value provided by the ROM 13 at the particular moment is loaded into the second counter 10. With constant speed, as shown in the first cycle in FIG. 3, this output value provided by the ROM 13 agrees exactly with the count condition of the counter 10 at that moment and no change is produced. In the second cycle shown in FIG. 3, however, for example on account of a lagging speed information, a dynamic change of speed has occurred and the count condition F of the counter 10 is changed to correspond with the output count value of the ROM 13 upon the arrival of the leading edge of the signal A, which is to say upon the appearance of the signal C. In the illustrated signal diagram, accordingly, the ignition timing shifts in the retard direction. The electronic switch closure interval remains constant. If the leading edge of the signal A appears after the second counter 10 has reached the threshold value S1, then, when there is a dynamic change, a certain change of the switch closure interval takes place along with the shift of the ignition timing. This case occurs only at high speeds, where the dynamic variations are small. This change is small, however, and in the very next cycle will be corrected. The loading of the second counter 10 by the output signal of the adder 18 produces in this case also an approximately correct beginning of the switch closure interval. The conditions just described can appear only at extremely strong dynamic events, so that both under constant conditions and also under normal dynamic variations the switch closure interval remains absolutely constant.

The time separation between the zero crossing of the second counter 10 (threshold value So) and the reaching of the threshold value S2 provides a minimum open interval of the electronic switch 29. This is necessary to assure that the initiation of combustion is produced. At high speeds the set switch closure intervals will ultimately become greater than the time separation from spark to spark. In order to prevent this, the closing of the electronic switch 29 is suppressed during the set minimum open interval, which thus overrides the set and normally constant closure interval. The minimum open interval can be varied by variation of the threshold S2. This can be produced in a manner not shown in the diagram by causing the ROM 12 to have its output modified by a correction circuit in which correction parameters are provided as inputs, for example temperature or supply voltage. Such a variation of the minimum open interval is described further below in connection with other illustrative embodiments. It should nevertheless be emphasized that these methods can also be used for modifying the output of the ROM 12 and applied to obtain variation of this minimum open interval of the switch 29.

The timing diagram shown in FIG. 4 illustrates the conditions at high speeds. The second counter 10 can no longer reach the threshold value S1 when it is loaded. Since at the moment of loading, the count value is already below the threshold value S1, the comparator 11 immediately provides a signal, whereupon the closure interval of the electronic switch 29 begins with the loading of the second counter 10. The control of the minimum open interval here takes over, because the time spacing between two closure intervals of the electronic switch 29 is now described by this minimum open interval. In the third cycle illustrated in FIG. 4, a speed reduction takes place, which is accompanied by a prolonged signal A. The count condition upon loading of the counter 10 again exceeds the threshold value S1, and the open interval of the electronic switch is again greater than the minimum open interval and is now set by the threshold value S1. The correction of the count condition F illustrated at the beginning of the third transducer signal A that appears in FIG. 4 has already been described in connection with FIG. 3.

Figure 5:
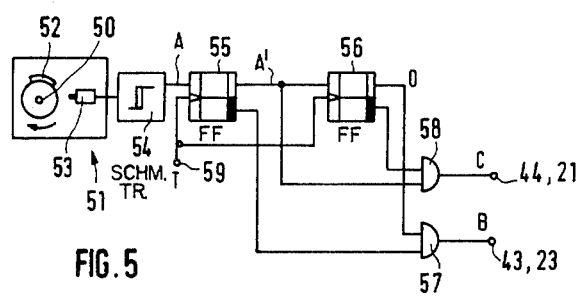
FIG. 5 is a circuit diagram of a detail of the circuit of FIG. 1 illustrating a circuit for producing pulses corresponding to the leading and trailing edges of a transducer signal.

The circuit shown in FIG. 5 illustrates a method known in itself for generating the leading edge and trailing edge signals B and C. A transducer type of signal generator 51, connected to a rotating shaft 50, preferably the crankshaft of the engine for which the ignition is being provided, is shown in this case as an inductive transducer. An angular segment 52, for example a 60° angular segment, is fastened on the periphery of the rotating shaft 50 and in its revolution it goes past the inductive pick-up 53 that generates a signal with at least its duration proportional to angle. Instead of provision of the signal generator as an inductive transducer other equivalents are possible, for example a mechanical interrupter or a Hall generator. The output of the signal generator 51 is furnished through a pulse-shaping stage 54 that is preferably constituted as a Schmitt trigger circuit, after which it is supplied to the input of a first D-type flip-flop 55. An output of the D-type flip-flop 55 is connected with the input of a second D-type flip-flop 56, the output of which in turn is connected through an eighth AND-gate 57 to the terminals 43 and 23 of FIG. 1. The complementary output of the first D-type flip-flop 55 is connected with a second input of the AND-gate 57. The complementary output of the second D-type flip-flop 56 is connected through a ninth AND-gate 58 to the terminals 44 and 21 of FIG. 1. The input of the second D-type flip-flop 56 is connected with a second input of the AND-gate 58. The pulses of the counting frequency T are provided to the synchronizing inputs of both D-type flip-flop 55 and 56.

Figure 6:
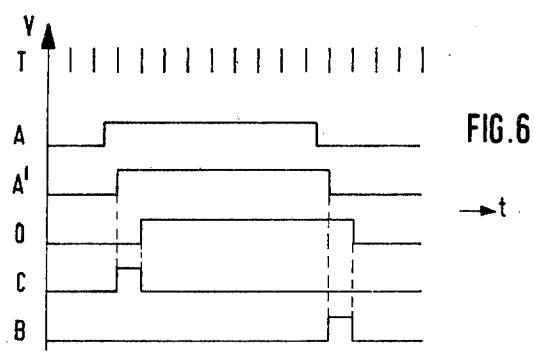
FIG. 6 is a timing diagram in the form of a graph for explaining the operation of the circuit of FIG. 5.

The operation of the circuit illustrated in FIG. 5 is best understood with reference to the timing diagram given in FIG. 6. The signal proportional to rotary angle produced in the generator 55 is transformed in the pulse-shaping stage 54. into the rectangular signal A. This signal A is synchronized by the first D-type flip-flop 55, i.e. the signal A is transferred into the multivibrator 55 at the beginning of the next stroke of the counting frequency T and likewise it is extinguished at the end of the next following stroke of the counting frequency T. This synchronized signal A' is supplied to the second flip-flop 56, offset there by one stroke of the counting frequency and appears as signal O at one input of the AND-gate 57. By combination of the two signals A' and O with their complementary signals in the AND-gates 57 and 58 the signals B and C are produced as flank signals in a readily evidenced manner.

In the second embodiment of the invention illustrated in FIG. 7 the electronic control system 60 for the ignition system is shown merely as a box to which the engine parameter signals already explained in FIG. 2 as well as the signal A in the signal generator of FIG. 1 are supplied at the left. The circuit of the components 27 to 31 correspond to those of the first embodiment. The terminal 61 is connected to the positive terminal of the supply voltage. Between the emitter of the electronic switch 29 constituted as a transistor and ground is interposed a current-measuring device 62, particularly a current-measuring resistor. The emitter of the transistor 29 is also connected to one input of a threshold stage 63 constituted as an operational amplifier. The output of the threshold stage 63 is supplied by way of a terminal 64 and an electrical transfer switch 65 to the K input of the JK flip-flop 27. The transfer switch 65, which may be referred to as a switch-over device, is subject to being switched over by a signal f(n) that is dependent upon engine speed, i.e. the K input of the flip-flop 27 is, in response to the signal dependent upon engine speed, connected either with the terminal 64 or with a point in the electronic control system at which a signal representing the computed ignition timing is available. In the case of the embodiment illustrated in FIG. 1 this would be the output M of the second counter 10. A second electrical transfer switch 67 is controllable by way of a terminal 66 by the speed-dependent signal f(n). By this second switch-over device the second input of the threshold stage 63 is capable of being connected either to the terminal 68 or the terminal 69.

The timing diagram given in FIG. 8 is useful for explaining the operation of the embodiment represented in FIG. 7. At medium speed, e.g. up to 4000 r.p.m., the speed-dependent signal f(n) sets the first transfer switch 65 onto the terminal 64 and the second transfer switch 67 onto the terminal 68. The terminal 68 presents a signal corresponding to the threshold value S3. A multivibrator 27 is activated by a signal from the ignition timing computer, for example in the manner shown in FIG. 1, producing a signal G' at the terminal 28 by which the electronic switch 29 is closed. A current $I_z$ begins to flow through the primary winding of the ignition transformer 30 and through the current measuring resistor 62, and rises in strength as it flows. Voltage drop is produced across the resistor 62 by this current rise and when its value reaches the threshold value S3, a signal P is produced at the output of the threshold stage 63 which is furnished to the K input of the flip-flop 27 and resets it, so that the electronic switch 29 is again opened. The interruption of the current flow $I_z$ produces both the end of the signal P and also the initiation of a spark in the gap 31. In spite of external influences such as voltage and temperature fluctuations and constant or very slow statistical factors such as the manufacturing scatter of the components in their respective tolerance ranges and their aging with time, in this circuit the transistor is always driven as a pure switching transistor and the power consumption is thereby minimized. If these influences and factors do not change, the closed interval of the switch is independent of engine speed, and in the particular range here under consideration is exactly constant.

At higher speed, in which a minimum open interval must be maintained for the switch as already described, there is insufficient time for complete saturation of the ignition transformer, so that a computer-timed ignition must be brought into operation as in the first illustrated embodiment. For this purpose, the transfer switch 65 is switched over in the present case at a speed of, for example, 4000 r.p.m., by the speed dependent signal f(n), so that the K input of the multivibrator 27 will again respond to a circuit that can, for instance, correspond in principle to that of the first embodiment. Furthermore, the second transfer switch 67 is switched over so that the threshold stage 63 now operates at the threshold level S6 supplied by the terminal 69. This threhsold value S6 lies so low that an output signal P appears at the terminal 64 immediately after the beginning of flow of current through the resistor 62. This signal P is now no longer used for triggering a spark, but rather, as more fully explained below, is used to participate in the correction of the computer-controlled timing, particularly the open interval threshold.

Figure 9:
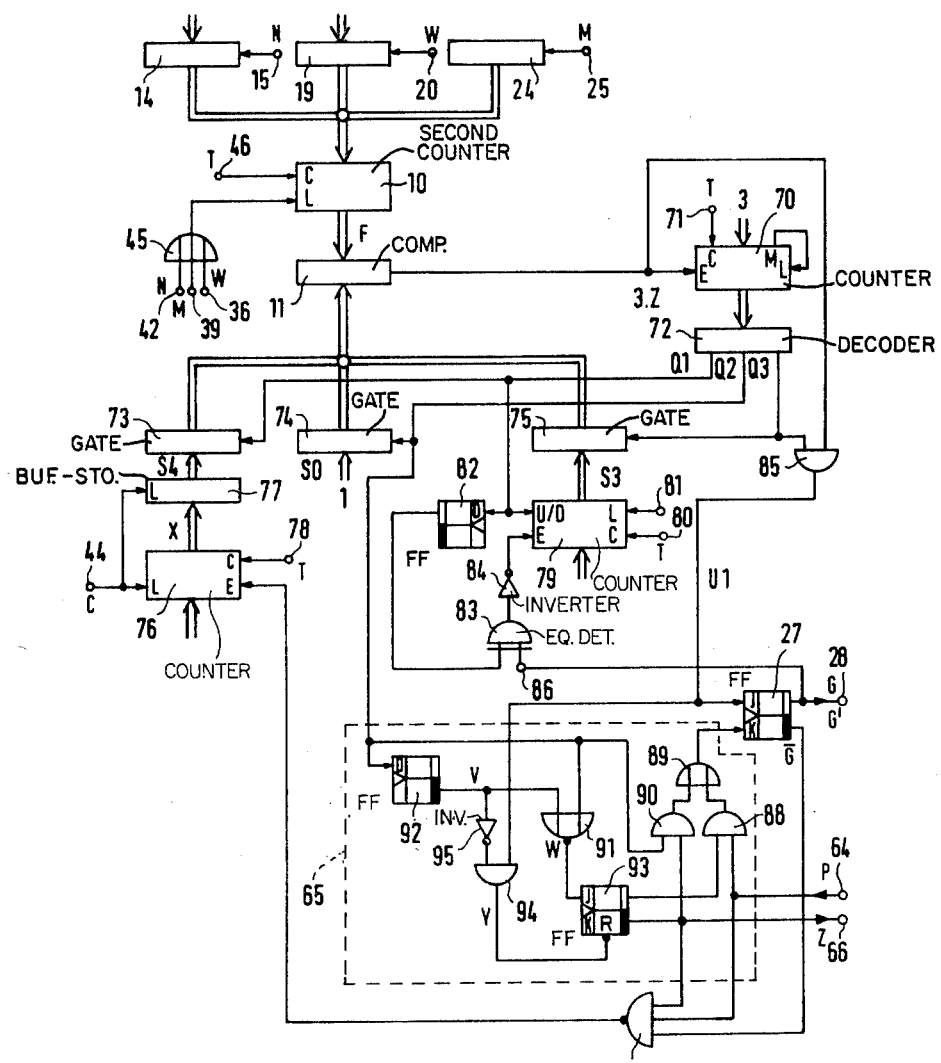
FIG. 9 is a more detailed diagram of circuits of the embodiment illustrated in FIG. 7.

FIG. 9 is a more detailed representation of the second embodiment shown in FIG. 7. The circuit components 10,11,14,15,19,20,24,25,36,39,42,45 and 46 designate the same elements as in the first embodiment and are interconnected in the same way. The same signals are passed or blocked by the multibit gates 14,19 and 24. The connection of the output M to the input E of the second counter 10, however, is omitted. At the terminals 20 and 36, there is no longer the signal L but rather a signal W the generation of which will be described further. The digital adder 18 is also omitted, as well as its connection to the count outputs of the second counter 10.

The output of the comparator 11 is connected to the blocking input E of a third counter 70, that is connected as a down-counter. The counting frequency T is supplied by way of a terminal 71 to the count-producing input C. The count content (parallel) inputs of the counter 70 are connected by fixed wiring so as to apply the binary numeral 3, since in the illustrated case three gates are to be controlled by the counter 70. The overflow output M is connected with the loading input L of the counter 70. The count content outputs of the counter 70 are connected with the parallel digital inputs of a decoding stage 72 that have three outputs Q1,Q2,Q3. One of the three outputs Q1,Q2,Q3 is selectively energized by the decoding stage 72 in accordance with the three possible binary numbers that may be present at the input of the decoding stage. By these outputs Q1,Q2 and Q3, three multibit transmission gates 73,74 and 75 are respctively controlled. The count content outputs of the several transmission gates 73,74,75 are all connected to one of the comparison inputs of the comparator 11.

The count content outputs of a fourth counter 76 that is connected as a down-counter are connected through a second buffer store 77 with the count content inputs of the fourth gate 73. The loading inputs of the counter 76 and of the buffer store 77 are supplied with a signal C over the terminal 44. The count content inputs of the counter 76 are connected by fixed wiring to provide a certain predetermined binary number which will be loaded into the counter when the loading input is operated. The counting frequency T is supplied by way of a terminal 78 to the counting stroke input C of the counter 76.

The count content inputs of the fifth multibit gate 74 are connected by fixed wiring to provide a very low binary number, in the illustrated case the number 1.

The count content outputs of a fifth counter 79 are connected to the sixth mulibit gate 75. The fifth counter 79 is a reversible (up/down) counter, the count content inputs of which are again connected by fixed wiring to provide a particular binary number. The counting frequency T is supplied by way of a terminal 80 to the count stroke input C. By way of another terminal 81, the switching-on signal for the entire electronic control system that is produced when the supply voltage is switched on is connected to the loading input L. The directional input U/D (up/down) of the counter 79 is connected with the Q1 output of the decoding stage 72. This output is also connected through a third D-type flip-flop 82 with the input of an inequality detector gate 83 that has its output connected through an inverter 84 to the blocking input E of the fifth counter 79.

The Q3 output of the decoding stage 72 is connected through a tenth AND-gate 85 with the J input of the flip-flop 27. The output of the multivibrator 27 that is connected with the terminal 28 is also connected by way of the terminal 86 with a second input of the inequality detector gate 83. The blocking input E of the third counter 70 is connected to a second input of the AND-gate 85. The complementary output of the flip-flop 27 is connected through a NAND-gate 87 with the blocking input E of the fourth counter 76. The terminal 64 is connected to a second input of the NAND-gate 87 and also, through an eleventh AND-gate 88 with an input of a second OR-gate 89 that has an output connected to the K input of the flip-flop 27. The terminal 66 is connected to a third input of the NAND-gate 87, as well as through a twelfth AND-gate 90, to a second input of the OR-gate 89. The Q2 output of the decoding stage 72 is connected, in the first place, with a second input of the AND-gate 90, in the second place with an input of a NOR-gate 91 and, in the third place, with the D input of a fourth D-type flip-flop 92. The complementary output of the flip-flop 92 is connected to a second input of the NOR-gate 91, the output of which is connected to the J input of a third JK-type flip-flop 93. The output of the multivibrator 93 is connected with a second input of the AND-gate 88 and the complementary output is connected with the terminal 66. The complementary output of the flip-flop 92 is connected through an inverter 95 and a third AND-gate 94 with the reset input R of the flip-flop 93. The output of the AND-gate 85 is connected to a second input of the AND-gate 94. The components 88 to 94 constitute the electrical switch-over circuit or transfer switch 65 of FIG. 7.

Figure 10:
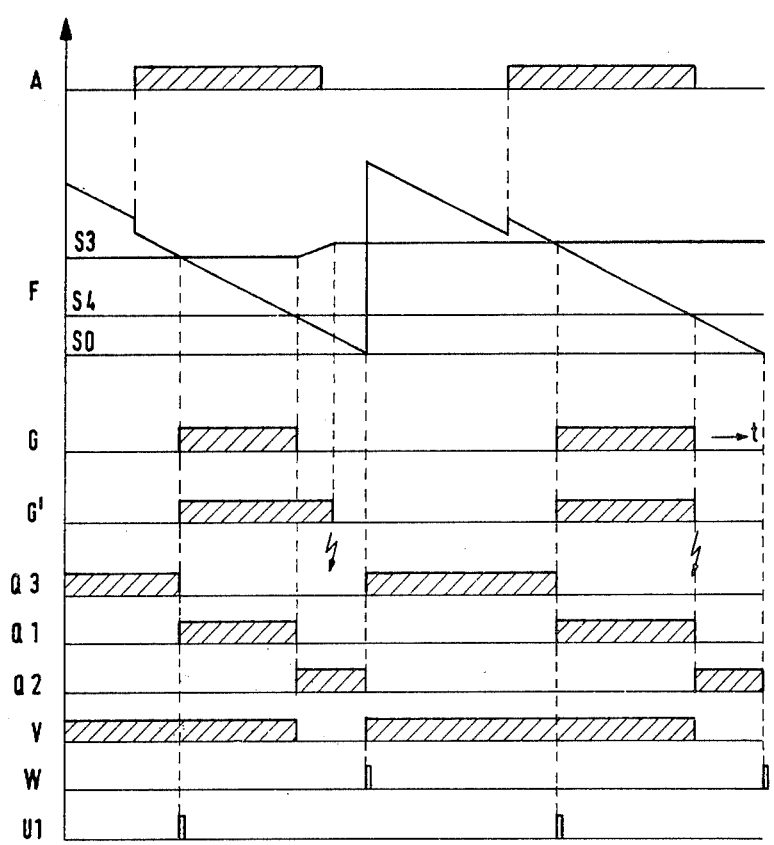
FIG. 10 is a timing diagram in the form of a graph for explaining the mode of operation of the embodiment of FIG. 9 involving ignition timing by the current rise in the primary circuit.

The count stroke inputs of the counters are connected in the diagram with variously designated terminals to each of which a counting frequency T is applied. This counting frequency can be the same, in which case all of these terminals can be connected together. The multivibrators shown also require a synchronizing frequency that likewise can be the same count frequency. The synchronizing inputs of the flip-flop are not further shown in the drawing. The timing diagrams shown in FIGS. 10 and 11 facilitate the understanding of the mode of operation of the circuit illustrated in FIG. 9. First, the mode of operation at low to medium speeds will be considered, which is illustrated in FIG. 10. The mode of operation of the multibit gates 14, 19 and 24 in cooperation with the second counter corresponds to that of the first embodiment. However, here the second multibit gate 19 is controlled by a signal W. The counter 10, in response to a signal W is loaded through the gate 19 with a binary number corresponding to the expected ignition angle and then begins to count downwards. At the beginning of a transducer signal A, thus by means of a signal C or N, the count condition of the counter 10 is set to correspond to the computed ignition timing, as in the case of the first embodiment. This process, as already shown, produces a reaction only when a dynamic change has taken place. In this range, a 1-signal is present at the Q3 output of the decoder stage 72, by which the multibit gate 75 is opened. In what follows, the signals appearing at the outputs Q1,Q2 and Q3 will themselves be designated Q1,Q2 and Q3 respectively.

With the gate 75 open, the count condition output of the counter 79, thus the threshold value S3, is provided to the comparison input of the comparator 11. As soon as the counter 10 reaches the count condition S3, the comparator 11 produces an output signal, by which, on the one hand, a signal U1 is caused to be produced by the AND-gate 85 and, on the other hand, by freeing the blocking input E of the counter 70, the latter is advanced by one count. The flip-flop 27 is set by the signal U1, producing a signal G or G' at the terminal 28, causing the beginning of the closure interval of the electronic switch (not shown in this figure).

As the counter 70 counts further, the Q3 output of the decoding stage 72 changes to an 0-signal and the Q1 output to a 1-signal. The gate 75 is then closed and the gate 73 opened.

At the comparison input of the comparator 11, there is now the initial count value content of the buffer store 77, thus the threshold value S4. When the counter 10 reaches the count value S4, the comparator 11 again produces a signal, through which the counter 70 is again advanced by one count. The Q1 output of the decoder stage 72 changes to a 0-signal and the Q2 output to a 1-signal. This output signal of the comparator 11 corresponds to the computed ignition timing moment. Ignition cannot be initiated, however, by the Q2 output of the decoder stage 72 and the AND-gate 90 and OR-gate 89, because the AND-gate 90 is blocked by the complementary output of the flip-flop 93, at which an 0-signal is present. Only by a signal P at the terminal 64 will the multivibrator 27 be reset through the AND-gate 88, which will result in an end to the closure interval of the electrical switch 29, thereby producing ignition. The signal G represented in FIG. 10 does not actually operate, but rather the closure time of the electronic switch 29 is provided by the signal G'.

As a result of the 1-signal at the Q2 output of the decoding stage 72 the binary number 1 is supplied through the gate 74 to the comparator 11, this number corresponding to the threshold value SO. This number is so small that in the FIG. 10 diagram it is regarded as lying on the zero line. During the presence of the Q2 signal at the output of the decoding stage 72 a 0-signal is present at the complementary output of the flip-flop 92 that naturally is delayed by one count interval with respect to the signal Q2. The signal sequence at the complementary output of the flip-flop 92 is designated V in FIG. 10. When the counter 10 reaches the count condition SO, the comparator 11 produces an output signal that again advances the counter 70 by one count. Since an overflow appears at the counter 70, the latter is loaded with the binary number 3 and a 1-signal is again produced at the Q3 output, while the Q2 output changes to a 0-signal. After the change of the Q2 output to a 0-signal, 0-signals are briefly present at both inputs of the NOR-gate 91, as a result of which for this brief interval a W-signal is generated at the output of the NOR-gate 91. As already mentioned above, the second counteer 10 is again reset by this W-signal. The conditions in the flip-flop 93 do not change, because this flip-flop was already set. Since a signal U1 does not appear simultaneously with an inverted signal V, no Y-signal can be produced. This prevents a resetting of the flip-flop 93. As a result of the thus continuously remaining O-signal at the complementary output of the flip-flop 93, a 1-signal is continououesly applied through the NAND-gate 87 to the blocking input E of the counter 76, as a result of which the count condition of that counter cannot change. The threshold value S4 thus remains steady.

If the computed timing moment (reaching of the threshold value S4) does not agree with the measured ignition moment that initiates the spark exactly, there then are different signals respectively present at the two inputs of the inequality detector gate 83 (exclusive-OR), as a result of which the output of that gate is set to a 1-signal. This again causes the inverter 84 to free the blocking input E of the counter 79 and the latter alters its condition in step with the counting frequency C during this discrepancy. If during this discrepancy of the ignition timing values a 1-signal is still present at the Q1 output of the decoder stage 72, that means that the measured ignition timing moment was earlier than the calculated one. The counter 79 is then put into downward counting by a signal on the directional input U/D. If, on the other hand, as shown in FIG. 10, a 0-signal is again present at the Q1 output at the beginning of this discrepancy, the counter 79 accordingly counts upwards and sets the threshold value S3. The beginning of the closure time of the electronic switch 29 is thereby set for the next cycle. The flip-flop 82 serves to equalize the operation time of the counting signals with reference to the multivibrator 27.

Figure 11:
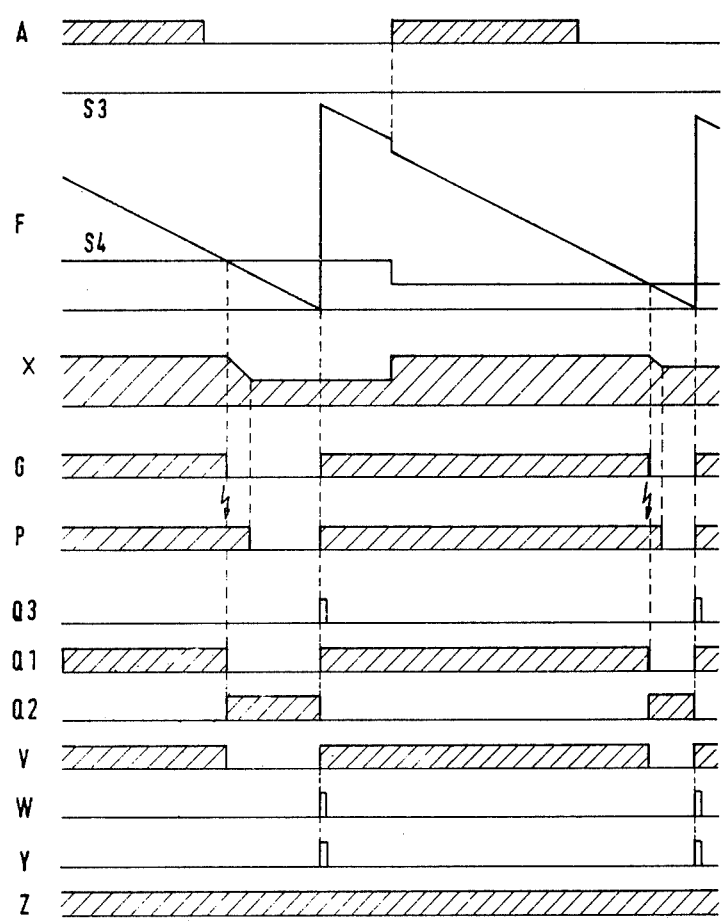
FIG. 11 is a timing diagram in the form of a graph for explaining the mode of operation of the circuit of FIG. 9 in the case of ignition timing by the ignition timing computation means.

In the higher speed range, for example above 4000 rpm, the conditions illustrated in FIG. 11 are observed. The recognition of such a high speed takes place in accordance with the embodiment of FIG. 1 in that the setting of the counter 10 to the threshold value S3 can no longer happen and therefore the comparator 11 provides a signal immediately upon loading of the counter, this signal indicating that the count value is below the threshold value S3. This comparator signal on the one hand produces an immediate transfer of the 1-signal from the Q3 output of the decoder stage to the Q1 output and, in the second place, produces, through the AND-gate 85, the signal U1 that starts the switch closure interval. As a result of the briefly remaining 1-signal at the Q3 output of the decoder stage 72, this opening of the AND-gate 85 is only possible for a short time. At the end of the 1-signal at the Q2 output of the decoder stage 72, a W-signal is produced, as already described, at the output of the NOR-gate 91. At the same time, however, as described, the signal U1 is produced, that produces a Y-signal through the AND-gate 94, because at this time the complementary output of the flip-flop 92 still provides a 0-signal and consequently the output of the inverter 94 produces a 1-signal. There are thus at the same time a W-signal and a Y-signal at the multivibrator 93. Since the reset input R is dominating, the flip-flop 93 becomes or remains reset, which means that a 1-signal is present at the complementary output of the flip-flop 93 and therefore also at the terminal 66. This 1-signal is represented in FIG. 11 by the signal Z. The AND-gate 88 remains continuously blocked for the signal P and the AND-gate 90 continously open for signals at the Q2 output of the decoder stage 72. The timing of ignition is no longer produced by P signals (measured timing moment) but at the beginning of a signal at the Q2 output of the decoder stage 72 (computed timing moment).

As already described in connection with FIG. 7, the transfer switch 67 there shown is operated by the signal Z at the terminal 66 and thereby switched over to a very low threshold value S6. A P signal at the terminal 64 is then at once generated by the threshold value stage 63 as soon as a small current begins to flow through the resistance 62. An operating time correction of the minimum open interval is produced by the counter 76 immediately after the ignition initiated. At this moment a $\overline{G}$ signal is present at the complementary output of the flip-flop 27. At the ignition timing moment a 1-signal is present at each of the inputs of the NAND-gate 87, as a result of which the blocking input E of the backwards counter 76 is set free. The latter now counts downward with the counting frequency T. Since the open switch interval begins with the ignition timing moment, which is to say that the electrical switch 29 is blocked, the current through the resistance 62 is at the same time interrupted. After a short time the threshold value S6 is crossed as a result of which, by way of the terminal 64 and the NAND-gate 87 the counter 76 is again blocked. The count condition of the counter 76 is then taken over into the buffer store 77 upon the occurrence of the next C-signal and at the same time the counter 76 is again set to its original value. The switching over of the ignition timing from the measured method to the computed method at higher speeds is without problems in this speed range, since dynamism problems become negligibly small at such high speeds. By this supplementary counting method a compensation of the ignition angle is produced for the operating time or response delays of the external components. The modification of the count value condition of the counter 10 by the leading edge of the A-signal takes place again as before.

Figure 12:
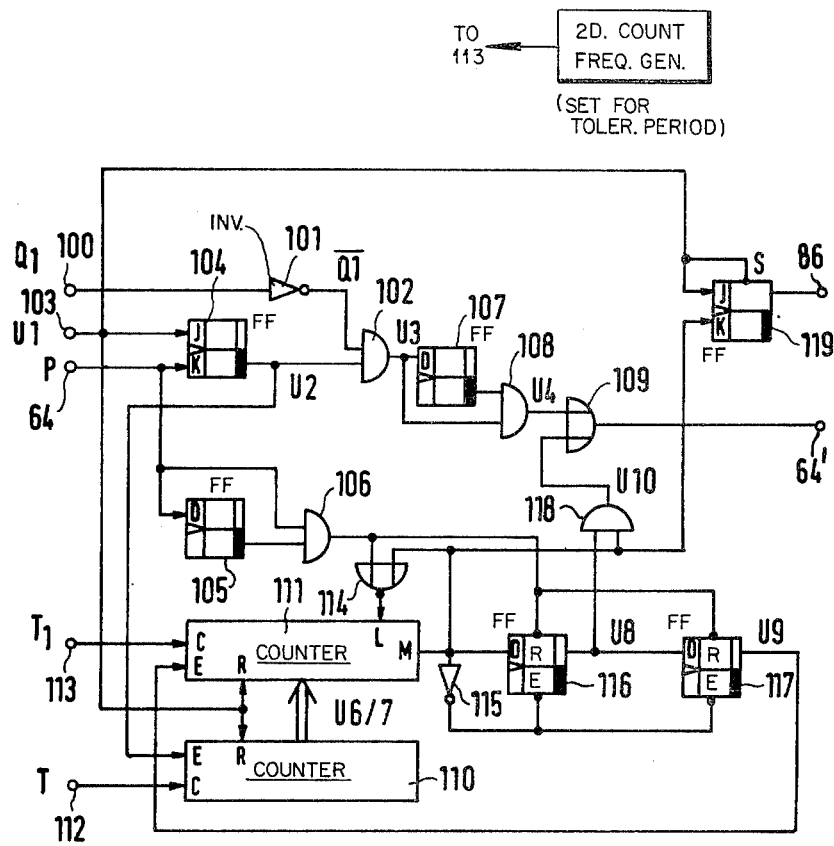
FIG. 12 is a circuit diagram of a third illustrative embodiment of the invention providing for ignition triggering during a tolerance period.

The circuit shown in FIG. 12 together with the circuit shown in FIGS. 9 and 7 forms a third illustrative embodiment of the invention. In order to combine FIG. 12 with the other figures for this purpose, the circuit is broken at the terminal 64 and the circuit illustrated in FIG. 12 is interposed there. This interposition is indicated in FIG. 12 by designation of the input of the circuit as the terminal 64 and the output of the circuit as the terminal 64'. The connection shown in FIG. 9 between the terminal 28 and the terminal 86 in this case must disappear, but the remainder of the circuit is retained.

The Q1 output of the decoder stage 72 is connected by way of a terminal 100 and an inverter 101 to one input of a four-teenth AND-gate 102. The output of the AND-gate 85 that supplies the signal U1 is connected by way of a terminal 103 with the J input of a fourth JK flip-flop 104, of which the complementary output is connected to a second input of the AND-gate 102. The terminal 64 is connected both with the K input of the flip-flop 104 and with the input of a fifth D-type flip-flop 105. The terminal 64 is also connected with one input of a fifteenth AND-gate 106 which has its second input connected to the complementary output of the flip-flop 105. The output of the fourteenth AND-gate 102 is, on the one hand connected to the input of a sixth D-type flip-flop 107 and on the other hand connected to one input of a seventeenth AND-gate 108, which has a second input connected to the complementary output of the flip-flop 107. The output of the AND-gate 108 is connected through a third OR-gate 109 to the output terminal 64'.

The terminal 103 is furthermore connected with the reset inputs R both of a sixth counter 110 and of a seventh counter 111, while the count content outputs of the counter 110 are connected to the count content inputs of the counter 111. A first counting frequency T is applied to the count stroke input C of the counter 110 by way of a terminal 112 and a second counting frequency T1 is applied to the count stroke input C of the counter 111 by way of a terminal 113. The output of the fifteenth AND-gate 106 is connected through a second NOR-gate 114 with the loading input L of the counter 111. The overflow output M of the counter 111 is, in the first place, connected through an inverter 115 with the blocking inputs E of both a seventh D-type flip-flop 116 and an eighth D-type flip-flop 117, in the second place with the D-input of the flip-flop 116, in the third place with the second input of the second NOR-gate 114, in the fourth place with one input of a seventh AND-gate 118 and finally input with the K input of a fifth JK flip-flop 119.

The output of the seventh D-type flip-flop 116 is connected both with a second input of the AND-gate 118 and with the D input of the eighth D-type flip-flop 117. The output of the flip-flop 117 is connected with the blocking input of the seventh counter 111. The output of the fourth JK flip-flop 104 is connected with the blocking input of the sixth counter 110. The output of the fifteenth AND-gate 106 is connected to the reset inputs of both of the flip-flop 116 and 117.

The terminal 103 is connected both with the J input and with the set input S of the fifth JK flip-flop 119, which has its output connected to the terminal 86.

Figure 13:
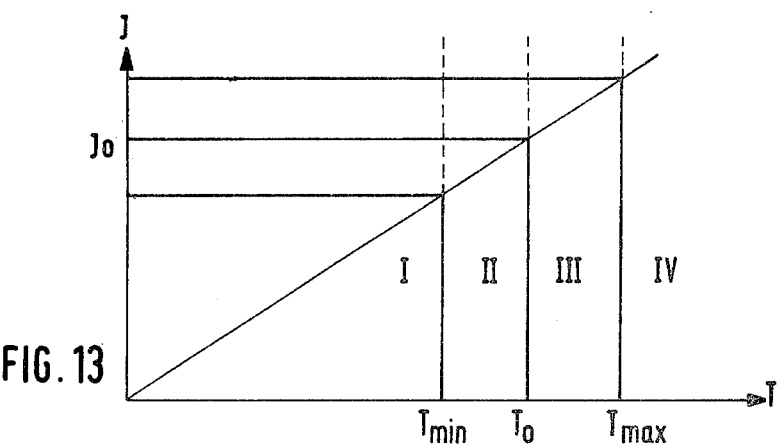
FIG. 13 is a graph for explaining the boundaries of the tolerance period involved in the operation of the circuit of FIG. 12.

The manner of operation of the third embodiment illustrated in FIG. 12 can be explained in principle with reference to the graph shown in FIG. 13. In order to prevent that the ignition angle should vary even with the smallest voltage or temperature fluctuations that occur between successive ignition moments, a tolerance zone or period is fixed for the permissible charging up of the ignition transformer with current, this tolerance zone extending from $T_{min}$ to $T_{max}$ and thus including the regions II and III designated in FIG. 13. The beginning $T_{min}$ of the tolerance period is provided by the occurrence of the signal P. If the computed ignition timing moment lies within the tolerance period, ignition will take place at this computed ignition timing moment. If the computed ignition moment lies in region I, ignition takes place at $T_{min}$, and if computed ignition moment lies in region IV, ignition is produced at $T_{max}$. The permissible tolerance width $T_{max}$-$T_{min}$ can have a fixed value or it can depend on the time required to reach the current limit provided by the threshold stage 63, as is provided by the embodiment shown. The nominal or desired current Io and the nominal or desired timing To are located in the middle of the tolerance field. For correction of the closure period limit, To is utilized as the desired ignition timing and the computed ignition timing is utilized as the actual value. By this method a supplementary dead time is avoided which would if present produce a dynamic degradation of the operation of the ignition timing computer, with the result that a computed ignition angle change shows itself at the output only by a change of the closure interval limit.

Figure 14:
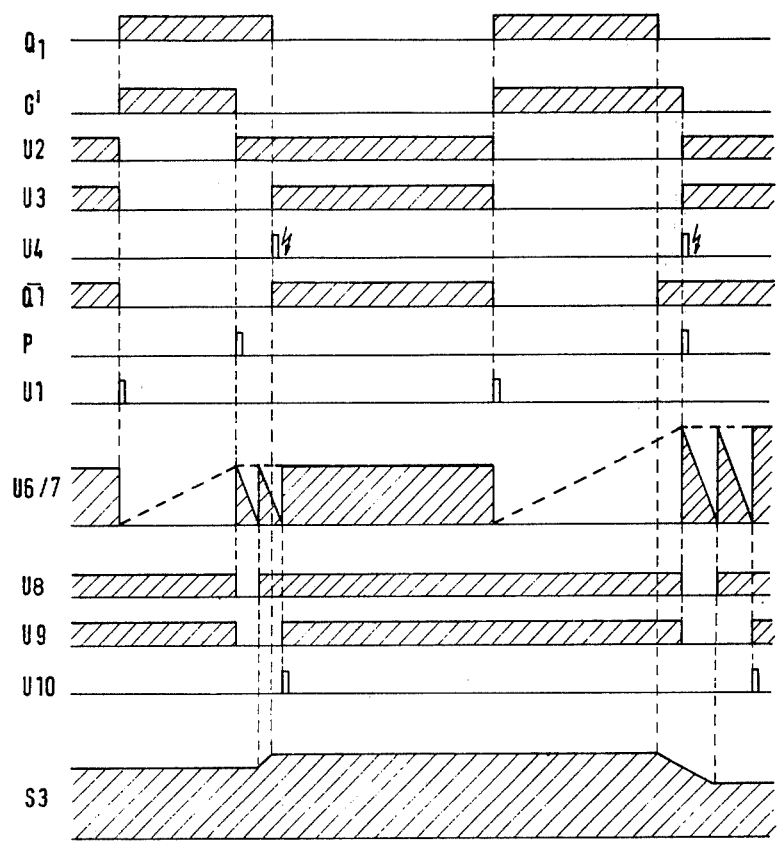
FIG. 14 is a timing diagram in the form of a graph for explaining the operation of the circuit of FIG. 12.

The third embodiment shown in detail in FIG. 12 will now be explained with reference to FIG. 14. The beginning of the closure interval is provided by the beginning of the signal at the Q1 output of the decoder stage 72 and hence by the signal U1. The flip-flop 104 is set by the signal U1, i.e. the signal U2 changes to an 0-signal. The three possible sequences leading to ignition timing are successively described below.

1. The computed ignition timing moment precedes a tolerance region (region I): This region is defined by the fact that the termination of the Q1 signal takes place before a P signal appears. This case is illustrated as the second cycle in FIG. 14. As a result of the P signal the U2 signal at the complementary output of the flip-flop 104 changes to a 1-signal. Since at the second input of the AND-gate 102 a 1-signal is already present on account of the signal $\overline{Q1}$, the signal U3 changes to a 1-signal and produces briefly signal U4 that initiates ignition through the OR-gate 109 and the terminal 64', in accordance with the second embodiment described above.

2. The computed ignition timing moment lies within the tolerance zone (regions II and III): This region is characterized by the appearance of the P signal before the end of Q1 signal. As a result of the P signal the U2 signal changes to a 1-signal, which does not produce ignition, because a 0-signal is present at the second input of the AND-gate 102. Only with the end of the Q1 signal is the $\overline{Q1}$ changed to a 1-signal to initiate ignition in the manner already described.

3. The computed ignition timing moment comes after the end of the tolerance (region IV): By a U1 signal both the counters 110 and 111 are reset. Since the flip-flop 104 is at the same set by this U1 signal, the U signal sets free the blocking input E of the counter 110, as a result of which the counter counts upward with the counting frequency T. This is indicated in FIG. 14 as the broken line signal U6. The counter 111 is at the same time blocked by the signal U9. In response to a P signal, in the first place the U2 signal changes to a 1-signal and blocks the counter 110 and in the second place the loading input L of the counter 111 is activated through the AND-gate 106 and the NOR-gate 114, as a result of which this counter takes over the count content of the counter 110. At the same time the two multivibrators 116 and 117 are reset at their reset inputs R by the signal provided at the output of the AND-gate 106, with the result that the signal U9 sets free the blocking input of the counter 111. This counter 111 now counts backwards with the frequency T1 (U7 in FIG. 14). When the count content of the counter 111 reaches the value zero, an overflow signal appears at the overflow output M by which, in the first place, the counter 110 is again loaded with the count content of the counter 111 through the NOR-gate 114 and, in the second place, with simultaneous setting free of the blocking inputs of the flip-flop 116 and 117, the multivibrator 116 is set. At the output of the flip-flop 116 the signal U8 appears. This U8 signal is present at one input of the AND-gate 118 but cannot initiate ignition because the overflow signal at the output M of the counter 111 in the meanwhile has vanished again. The counter 111 begins now to count downwards a second time and when it reaches its zero count content it again produces a signal at its overflow output M. This overflow signal this time initiates ignition through the AND-gate 118 and the OR-gate 109. This signal can naturally initiate ignition only if ignition has not already been produced by means of a signal U4. The second overflow at the counter 111 provides the end of the tolerance period at which, at the latest, ignition must have been provided. The second overflow signal of the counter 111 also sets free the blocking inputs of the flip-flop 116 and 117, whereupon the multivibrator 117 takes over the applied signal U8 as output signal U9 and blocks the counter 111. By variation of the frequencies of the counting signals T and T1 the tolerance period can be fixed which is composed of two downward count sequences in the counter 111. After the first downward count sequence the nominal ignition time To is reached. This nominal ignition timing moment is defined by the transition from zero to one of the signal U8. This U8 signal resets the multivibrator 119 that was set previously by the signal U1. At the terminal 86 the 1-signal changes to a 0-signal. This 0-signal produces a change of the count condition of the counter 79 and thus of the threshold value S3, operating over the inequality detector gate 83 similar to the operation of the embodiment of FIG. 9, so long as a discrepancy with respect to the computed ignition timing moment is present. This discrepancy appears in FIG. 14 in the first cycle between the beginning of the U8 signal (measured nominal ignition moment) and the termination of the Q1 signal (computed ignition moment). In the second cycle this discrepancy lies between the end of the Q1 signal (computed ignition moment) and the beginning of the U8 signal (measured nominal ignition moment). If the correction of the threshold value S3 is to be dispensed with, then it is sufficient to provide a single counting operation in the counter 111 for producing a tolerance period.

It is convenient to refer to the threshold value S4 as the second-to-be-reached threshold value even though at high engine speeds the value S3 is never actually crossed. Starting the count from below S3 is treated by the logic circuits as equivalent to reaching S3 at the start of the count. In other words "reaching" a threshold value in the case of down-counters means, in this context "getting below" as well as "getting just to" it.

In the several illustrative embodiments of the invention the system performance in individual ranges of operation is carried out respectively by various circuits which nevertheless produce essentially the same signal. These ranges or regions can be interchanged among the several illustrative embodiments and can in each case be varied. Thus for instance the appearance of threshold signals upon operation the second counter 10 can be performed according to the method illustrated in FIG. 1 or according to the method illustrated in FIG. 9. It is therefore evident that variations and modifications are possible within the inventive concept.

We claim:

1. A digital-electronically controlled ignition system for an internal combustion engine comprising an ignition transformer, a circuit including the primary coil of said transformer and an electronic switch, an electronic control circuit for said electronic switch, and a signal generator operated by said engine providing, in response to at least one reference mark of a rotary portion of said engine, at least signals (A) having steep leading (B) and trailing (C) edges, which signals are representative of a predetermined angular sector of rotation of said engine, said transformer having a secondary winding in circuit with at least one spark gap, said system further comprising in said electronic control circuit:

a generator of waves of a fixed counting frequency (T);

means responsive, for their activation, to said angular sector signals (A) of said engine-operated signal generator, and including a first counter (16) arranged to be driven by said counting frequency waves, for providing in successive counting operations digital signals (E) dependent on the duration of said angular sector signals and thereby representative of engine speed;

means for maintaining a substantially constant time interval of closure of said electronic switch (29) by predicting the current rise time in said primary coil of said ignition transformer (30) up to substantially maximum current therein; said means including a second counter (10) connected thereto to count at said counting frequency (T), and a recognition circuit connected thereto, including a digital comparator, for recognizing at least two threshold count value conditions (S1, S0; S3, S4) of said second counter (10) and for producing signals in response thereto, and logic circuits responsive to signals produced by said recognition circuits for causing the beginning and for causing the end of the closure interval of said electronic switch (29);

means (24) for transferring each said digital signal (E) representative of engine speed in the interval between counting operations of said first counter (16) to said second counter (10), for varying the timing of said time interval of switch closure in a subsequent ignition cycle in dependence on engine speed;

function generator means (13) for obtaining an ignition timing count value selected in accordance with the combination of an engine speed parameter and other engine operation parameters, to which means said parameters are provided as digital input signals; and means for supplying said ignition timing count value as a correction of the momentary count condition of said second counter (10) during the counting operation of said second counter at the moment of occurrence of a signal (C) indicative of the transit of one said reference mark of said rotary portion of said engine, in order to shift at least one of the beginning and the end of said time interval of switch closure.

2. A digital-electronically controlled ignition system as defined in claim 1, in which said timing count value supplying means includes a multibit gate (14) interposed between said function generator means (13) and said second counter (10) operable in response to said signal (C) indicative of the transit of said one reference mark of said portion of said engine and in which said last-mentioned signal is the leading edge of a said angular sector signal (A).

3. A digital-electronically controlled ignition system as defined in claim 1, in which said function generator means (13) are constituted as a read-only memory (ROM) storing a multiplicity of fixed values at addresses selectable by signals representative of engine operation parameters.

4. A digital-electronically controlled ignition system as defined in claim 3, in which means are provided for supplying said engine-speed signals (E) from said first counter (16) to said read-only memory (13) for participation in addressing said read-only memory.

5. A digital-electronically controlled ignition system as defined in claim 4, in which said second counter (10) has a multi-bit input and in which a first multi-bit gate (14) constituting said timing count value supplying means is interposed between the multi-bit input of said second counter (10) and the output of said read-only memory (13) and is connected so as to be operable for transfer of a multi-bit signal from said read-only memory to said second counter (10) in response to said leading edge (C) of said angular sector signal (A).

6. A digital-electronically controlled ignition system as defined in claim 5, in which said first counter (16) is provided with buffer storage means (17) at its output having a load command input (L) connected to respond to the trailing edge signal (B) of said angular sector signal (A).

7. A digital-electronically controlled ignition system as defined in claim 5, in which means (18,19) are provided for adding each said engine-speed digital signal (E) in the interval between counting operations of said first counter to the content present in said second counter and for transferring the sum into said second counter for its next operation by means of a second multi-bit gate (19) arranged to be operable by a signal (L or W) indicating the reaching of a particular condition of said second counter (10).

8. A digital-electronically controlled ignition system as defined in claim 7 having means for setting a minimal time interval of opening of said electronic switch (29) regardless of said means for maintaining a substantially constant time interval of closure of said electronic switch (29).

9. A digital-electronically controlled ignition system as defined in claim 8, in which said means for setting said minimal time interval of opening of said electronic switch (29) includes a circuit responsive to a third threshold count value condition (S2 or S0) of said second counter (10) and in which logic circuits include means (12, 26, 32, 33, 34) for preventing the closing of said electronic switch (29) during that portion of a counting operation of said second counter (10) that proceeds between the second-reached of said first two count value conditions thereof and the reaching of said third count value condition thereof.

10. A digital-electronically controlled ignition system as defined in claim 9, in which means are provided for utilizing the reaching of said third count value condition (S2 or S0) of said second counter (10) to provide said signal (L or W) indicative of the reaching of a particular condition of said second counter (10) utilized for operating said second multi-bit gate (19).

11. A digital-electronically controlled ignition system as defined in claim 10, in which said engine speed signal (E) transferring means is constituted by a third multi-bit gate (24) interposed between the output of said first counter (16) and said multi-bit input of said second counter (10) a multi-bit gate (24) arranged to be operable in response to a signal representative of engine speed lower than a predetermined low speed rate of revolution of said engine, for causing said second counter (10) to operate in a mode suitable for a starting-up operation of said engine.

12. A digital-electronically controlled ignition system as defined in claim 11 in which a tachogenerator (37''') and a threshold value circuit (37'') responsive to the output of said tachogenerator are provided as means for producing said signal indicative of a low-speed rate of rotation of said engine.

13. A digital-electronically controlled ignition system as defined in claim 11, in which the low-speed designating signal is provided by the engine starter switch (37').

14. A digital-electronically controlled ignition system as defined in claim 13, in which second logic circuit means are provided for interconnecting control circuits of said first, second and third multibit gates (14, 19, 23) in such a manner that, in response to said signal indicative of speed of said engine below a predetermined low speed, not only is said third multi-bit gate (24) made openable but said first and second multi-bit gates (14, 19) are caused to be unopenable.

15. A digital-electronically controlled ignition system as defined in claim 14, in which said second counter (10) has a multi-bit output, said recognition circuits responsive to threshold count value conditions of said second counter (10) are provided with digital reference value storage means (12; 76–79) having a multi-bit output, and said digital comparator of said recognition circuit, is provided with one multi-bit input connected to the multi-bit output of said second counter (10) and another multi-bit input connected to the multi-bit output of said digital storage means (12; 76–79).

16. A digital-electronically controlled ignition system as defined in claim 15, in which said digital storage means (12; 76–79) are provided with means for switching over the output thereof from one stored threshold value to another in response to the reaching of a count value in said second counter (10) equal to said one stored threshold value.

17. A digital-electronically controlled ignition system as defined in claim 15, in which said digital storage means includes a second read-only memory (12) in which a plurality of threshold count values are selectably readable.

18. A digital-electronically controlled ignition system as defined in claim 17, in which said second counter (10) has an overflow or minimum-maximum output (M) serving as a portion of said recognition circuit by which one of said threshold value signals (So) is producible in response to passage through zero of the count value content of said second counter (10).

19. A digital-electronically controlled ignition system as defined in claim 18, in which a bistable flip-flop circuit (33) is provided as means for switching over the output of said digital storage means (12) and said bistable circuit is connected so as to be responsive to said threshold value signal producible by the overflow output (M) of said second counter (10) and also to the output of said comparator (11).

20. A digital-electronically controlled ignition system as defined in claim 17, in which a third counter (70) is provided for counting output signals of said comparator (11) for switching over among at least one three stored values of said digital storage means (76–79), and in which, further, said third counter (70) is so constituted as to provide at least three counting operations having counting steps and that at least three gates (73–75) are operable in alternation by the count value conditions in said third counter (70) for supplying at least three stored values (S0, S3, S4) of said digital storage means (76–79) in sequence to said comparator (11).

21. A digital-electronically controlled ignition system as defined in claim 20, in which correcting means are provided for at least one of said stored values (S4, S3) of said digital storage means (76–79).

22. A digital-electronically controlled igniton system as defined in claim 21, in which each said correcting means comprises a correction counter (76, 79) the count value content of which is subject to modification by an electrical magnitude available in the ignition system and in which modification of the count value content of the correction counter produces modification of the stored value (S4, S3) to be provided by said digital storage means (76–79).

23. A digital-electronically controlled ignition system as defined in claim 22, in which thermometric means having an electrical output are provided and in which said electrical output thereof is utilized as an electrical magnitude of the ignition system for modifying one of said correction counters.

24. A digital-electronically controlled ignition system as defined in claim 22, in which the value of the supply voltage of the ignition system is utilized as an electrical magnitude for modifying the count value content of one of said correction counters.

25. A digital-electronically controlled ignition system as defined in claim 20, in which a current-measuring means (62) is provided in series with said electronic switch (29) so as to provide an output voltage, and in which, further, there is also provided a threshold-responsive stage responsive to the output of said current-measuring means (62), and in which a controllable switch-over circuit (65) is provided for the control input of said electronic switch (29) which is controllable by a signal dependent upon engine speed for selecting for control of said electronic switch either the output signal (P) of said threshold responsive stage or an the output of said logic circuits responsive to counting threshold valve (S4) of the count condition of said second counter (10).

26. A digital-electronically controlled ignition system as defined in claim 25, in which said switch-over circuit (65) consists essentially of a bistable flip-flop circuit (93).

27. A digital-electronically controlled ignition system as defined in claim 25, in which third logic circuit means are provided for producing said signal dependent upon engine speed for control of said switch-over device (65) and said third logic circuit means are constituted so as to provide a signal (Y) if directly after the occurrence of a signal (V) indicating the end of count of said second counter (10), a signal is produced by said comparator (11) responsive to the count value condition of said second counter (10) becoming lower than said first threshold count value (S3) thereof.

28. A digital-electronically controlled ignition system as defined in claim 25, in which a first correcting means (76) is provided for correcting the stored value of said digital storage means (76, 77) corresponding to said second-to-be-reached counting threshold value (S4) of said second counter (10) after switching over of said switch-over device (65) in response to engine rotation speed being above a threshold speed, in the coincident presence of signal ($\bar{G}$) indicative of the computed open interval for the electronic switch (29) provided as an output of said function generator means (13) and also of a signal (P) provided by the threshold stage responsive to said current-measuring means (62) indicative of flow of current in the primary circuit of the ignition transformer (30).

29. A digital-electronically controlled ignition system as defined in claim 28, in which said first correcting means is constituted by a fourth counter (76) arranged to have its count content variable by said counting frequency (T) waves and also arranged to receive from said digital storage means (76, 77), upon the occurrence of a signal (C) of the transit of one said mark of said engine, the stored value corresponding to said second-to-be-reached threshold value (S4) of the count content of said second counter (10).

30. A digital-electronically controlled ignition system as defined in claim 29, in which said fourth counter (76) is a down-counter.

31. A digital-electronically controlled ignition system as defined in claim 29, in which said digital storage means (76–79) includes a buffer storage means (77) provided at the output of said fourth counter (76).

32. A digital-electronically controlled ignition system as defined in claim 28, in which said threshold stage responsive to said current-measuring means (62) includes a second switchover device (67) for reducing to a small value the current threshold of said threshold stage in response to an indication of engine speed exceeding a predetermined engine speed.

33. A digital-electronically controlled ignition system as defined in claim 28, in which a second correcting means (79, 82–84) is provided for varying the stored value in said digital storage means (79) corresponding to a first-to-be-reached threshold value (S3) of said second counter (10) during a time interval between computed ignition timing and ignition timing measured by said threshold stage of said current-measuring means.

34. A digital-electronically controlled ignition system as defined in claim 33, in which said second correction means includes a fifth counter (79) of which the count content is variable by said counting frequency (T) waves and which is arranged to receive from said digital storage means, upon occurrence of a transfer signal, the stored value corresponding to said first-to-be-reached threshold count value of said second counter (10).

35. A digital-electronically controlled ignition system as defined in claim 34, in which said fifth counter (79) is constituted as a reversible counter and is provided with an up/down output for controlling the direction of count which is connected to an output of said third counter (70, 72) and has an enable/disable input controlled by the output of an inequality detector (83, 84) for detecting inequality of signals respectively derived from different outputs of said third counter (70, 72).

36. A digital-electronically controlled ignition system as defined in claim 25, in which an ignition-time stabilizing fourth logic circuit means (FIG. 12) is provided for allowing a signal corresponding to said second-to-be-reached threshold value (S4) of said second counter (10) to time ignition in said engine only within a tolerance period of settable duration beginning with the appearance of an output signal of said threshold stage (63) of said current-measuring means (62) under conditions in which said first switch-over circuit (65) is in the condition for control of ignition timing by said threshold stage of said current-measuring means.

37. A digital-electronically controlled ignition system as defined in claim 36, in which a sixth counter (111) is provided for setting the duration of said tolerance period and having a settable count condition for terminating its counting period.

38. A digital-electronically controlled ignition system as defined in claim 37, in which a seventh counter (110) is provided for variation of the duration counting of said sixth counter in dependence on the rise time of current through said electronic switch (29), said seventh counter being connected so as to vary the settable final count of said sixth counter during said rise time of said current.

39. A digital-electronically controlled ignition system as defined in claim 38, in which means are provided for the transfer of the count value content of said seventh counter (110) into said sixth counter (111) in response to the output (P) of the threshold stage (63) of said current-measuring means (62) and in which, further, said sixth counter (111) is a down counter.

40. A digital-electronically controlled ignition system as defined in claim 39, in which said sixth counter (111) is connected so as to determine said predetermined duration of said tolerance period during which ignition may be produced in response to a signal of said second-to-be-reached threshold value (S4) of said second counter (10) by means of two counting periods of said sixth counter (111) and in which, further, said sixth counter is arraged to provide as an output an overflow signal following a first of said two counting periods, which output is connected to provide said overflow signal to said second correction means (79, 82–84).

41. A digital-electronically controlled ignition system as defined in claim 40, in which at least one storage stage (116, 117) is provided for storing overflow signals appearing at the end of a count period of said sixth counter (111).

42. A digital-electronically controlled ignition system as defined in claim 37, in which an interlock logic circuit (100–104, 107, 108) is provided for providing an output signal upon concurrent appearance of a signal ($\overline{Q1}$) derived from an output of said logic circuits responsive to said recognition circuit and indicative of the computed open time of said electronic switch (29) and of a signal (U2) of a storage stage (104) contained in said interlock logic circuit which is connected for storing an output signal (P) of the threshold stage (63) of said current-measuring means (62), and in which an OR-gate (109) is provided having one input connected to the output (U4) of said interlock logic circuit and another input connected for response to a signal (U10) indicative of the end of counting of said sixth counter (111) for providing an output signal to said switch-over device (65) for controlling ignition timing of the engine.

43. A digital-electronically controlled ignition system as defined in claim 17, in which said second read-only memory is provided by fixed wiring (71–75).

44. A digital-electronically controlled ignition system as defined in claim 43, in which said second counter (10) has an overflow or minimum-maximum output (M) serving as a portion of said recognition circuit by which one of said threshold value signals (So) is producible in response to passage through zero of the count value content of said second counter (10).

45. A digital-electronically controlled ignition system as defined in claim 44, in which a bistable flip-flop circuit (33) is provided as means for switching over the output of said digital storage means (71–75) and said bistable circuit is connected so as to be responsive to said threshold value signal producible by the overflow output (M) of said second counter (10) and also to the output of said comparator (11).

46. A digital-electronically controlled ignition system as defined in claim 43, in which a third counter (76–79) is provided for counting output signals of said comparator (11) for switching over among at least three stored values of said digital storage means (76–79), and in which, further, said third counter (70) is so constituted as to provide at least three counting operations having counting steps and that at least three gates (73–75) are operable in alternation by the count value conditions in said third counter (70) for supplying at least three stored values (S0, S3, S4) of said digital storage means (76–79) in sequence to said comparator (11).

47. A digital-electronically controlled ignition system as defined in claim 46, in which correcting means are provided for at least one of said stored values (S4, S3) of said digital storage means (76–79).

48. A digital-electronically controlled ignition system as defined in claim 47, in which each said correcting means comprises a correction counter (76–79) the count value content of which is subject to modification by an electrical magnitude available in the ignition system and in which modification of the count value content of the correction counter produces modification of the stored value (S4, S3) to be provided by said digital storage means (76–79).

49. A digital-electronically controlled ignition system as defined in claim 48, in which thermometric means having an electrical output are provided and in which said electrical output thereof is utilized as an electrical magnitude of the ignition system for modifying one of said correction counters.

50. A digital-electronically controlled ignition system as defined in claim 48, in which the value of the supply voltage of the ignition system is utilized as an electrical magnitude for modifying the count value content of one of said correction counters.

* * * * *